United States Patent
Miller et al.

(10) Patent No.: US 10,011,186 B2
(45) Date of Patent: Jul. 3, 2018

(54) METHODS AND SYSTEMS FOR EXTENDING ELECTRIC IDLE

(71) Applicant: Ford Global Technologies, LLC, Dearborn, MI (US)

(72) Inventors: Kenneth James Miller, Canton, MI (US); Angel Fernando Porras, Dearborn, MI (US); William Paul Perkins, Dearborn, MI (US); Jimmy Kapadia, Ottawa Hills, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 15/091,085

(22) Filed: Apr. 5, 2016

(65) Prior Publication Data

US 2017/0282737 A1 Oct. 5, 2017

(51) Int. Cl.
*B60L 11/18* (2006.01)
*B60W 10/06* (2006.01)
*B60W 10/26* (2006.01)

(52) U.S. Cl.
CPC .......... *B60L 11/1861* (2013.01); *B60W 10/06* (2013.01); *B60W 10/26* (2013.01)

(58) Field of Classification Search
CPC .... B60L 11/1861; B60W 10/06; B60W 10/26
USPC .......................................................... 701/22
See application file for complete search history.

(56) References Cited

U.S. PATENT DOCUMENTS

| 5,285,862 | A  | * | 2/1994  | Furutani  | B60K 6/28 180/65.245 |
| 7,665,557 | B2 |   | 2/2010  | Hughes et al. | |
| 8,210,986 | B2 |   | 7/2012  | Saito | |
| 8,742,726 | B2 |   | 6/2014  | Park et al. | |
| 2005/0061561 | A1 | * | 3/2005 | Leonardi | B60K 6/28 180/65.1 |
| 2011/0266865 | A1 | * | 11/2011 | Okabe | B60W 10/06 307/10.6 |
| 2014/0156132 | A1 | * | 6/2014 | Ichimoto | B60W 10/06 701/22 |
| 2014/0365099 | A1 | * | 12/2014 | Tochigi | F02D 17/04 701/99 |
| 2014/0371983 | A1 | * | 12/2014 | Miyashita | B60L 1/003 701/36 |
| 2017/0080822 | A1 | * | 3/2017 | Lee | B60L 11/1862 |
| 2017/0145977 | A1 | * | 5/2017 | Toyama | F02N 11/084 |

* cited by examiner

*Primary Examiner* — Tan Q Nguyen
(74) *Attorney, Agent, or Firm* — David Kelley; McCoy Russell LLP

(57) ABSTRACT

Systems and methods for operating a vehicle in an electric idle mode are presented. The vehicle electrical idle mode may be characterized as a mode where the vehicle's engine is off; the vehicle increases torque to vehicle wheels responsive to an application of an accelerator pedal, release of a brake pedal, or a vehicle occupant shifting a transmission; and the vehicle's battery supplies electrical energy to devices of the vehicle being operated by a vehicle occupant.

12 Claims, 6 Drawing Sheets

METHODS AND SYSTEMS FOR EXTENDING ELECTRIC IDLE

FIELD

The present description relates to systems and methods for extending a period of time a vehicle may provide electrical energy to devices while an energy storage device of the vehicle is not receiving charge. The methods and systems may be useful for a variety of hybrid and electrically powered drivelines.

BACKGROUND AND SUMMARY

Hybrid vehicles may be used as emergency vehicles such as police interceptors or fire department command and control vehicles. While performing these duties, the vehicles may spend large amounts of time in a stationary state while police officers or firemen perform paperwork or receive information from a dispatch service or other police officers or firemen. The vehicle's engine may be stopped while the vehicle is stopped to conserve chemical fuel (e.g., gasoline). The vehicle's energy storage device may supply electrical energy to electrical consumers such as radios, computer systems, lights, sirens, etc. Such operating conditions may be referred to as electric idle. However, if an amount of charge stored in the energy storage device is reduced to less than a threshold, the vehicle's engine may be started so that an alternator or generator may continue supplying energy to the electrical consumers and recharge the energy storage device. Nevertheless, restarting the engine may not be desirable during some conditions.

The inventors herein have recognized the above-mentioned disadvantages and have developed a method for operating a vehicle, comprising: estimating whether or not a future vehicle electric idle will exceed a threshold energy consumption amount; adjusting a value of an electric energy storage device state of charge (SOC) desired value responsive to an estimate that the future vehicle electric idle will exceed the threshold energy consumption amount; and adjusting an electric energy storage device SOC to the electric energy storage device SOC desired value via the controller.

By estimating whether or not a future vehicle electric idle will exceed a threshold energy consumption amount and adjusting a value of a battery target or desired state of charge based on the estimate of exceeding the threshold energy consumption amount, it may be possible to extend an electric idle duration and reduce a number of times a vehicle's engine is restarted while the vehicle is stationary. Alternatively, an estimate of a threshold electric idle time duration may be provided and the electric energy storage device desired value, or alternatively SOC threshold limit not to be exceeded, may be adjusted responsive to the threshold electric idle time duration. In addition, vehicle occupants may be provided a human/machine input that provides a sole function of adjusting battery state of charge to extend or reduce an amount of charge that may be consumed in an electric idle mode so that a duration of electric idle may be extended. Extending the electric idle time may reduce a number of engine starts. Further, engine starting may be inhibited in electric idle mode so that an amount of time the vehicle is used to silently approach a target may be increased.

The present description may provide several advantages. For example, the approach may reduce a number of engine starts during a time a vehicle is stationary and powering electrical devices. Further, the approach may extend an amount of time a vehicle may be used to silently approach a target. Further still, the approach may make operating the vehicle less objectionable to a driver since the engine may be started and stopped less frequently.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
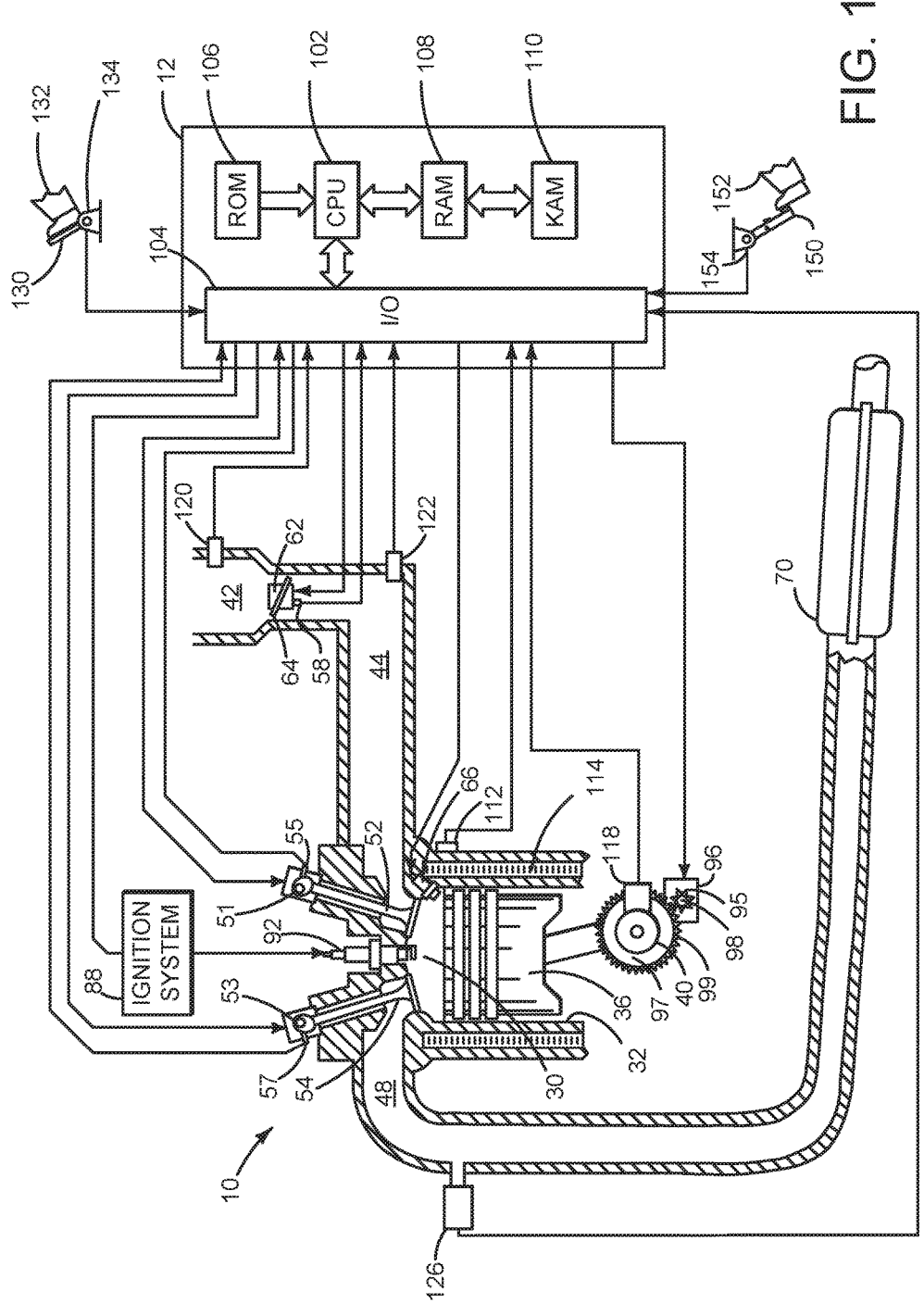
FIG. 1 is a schematic diagram of an engine.
Figure 2:
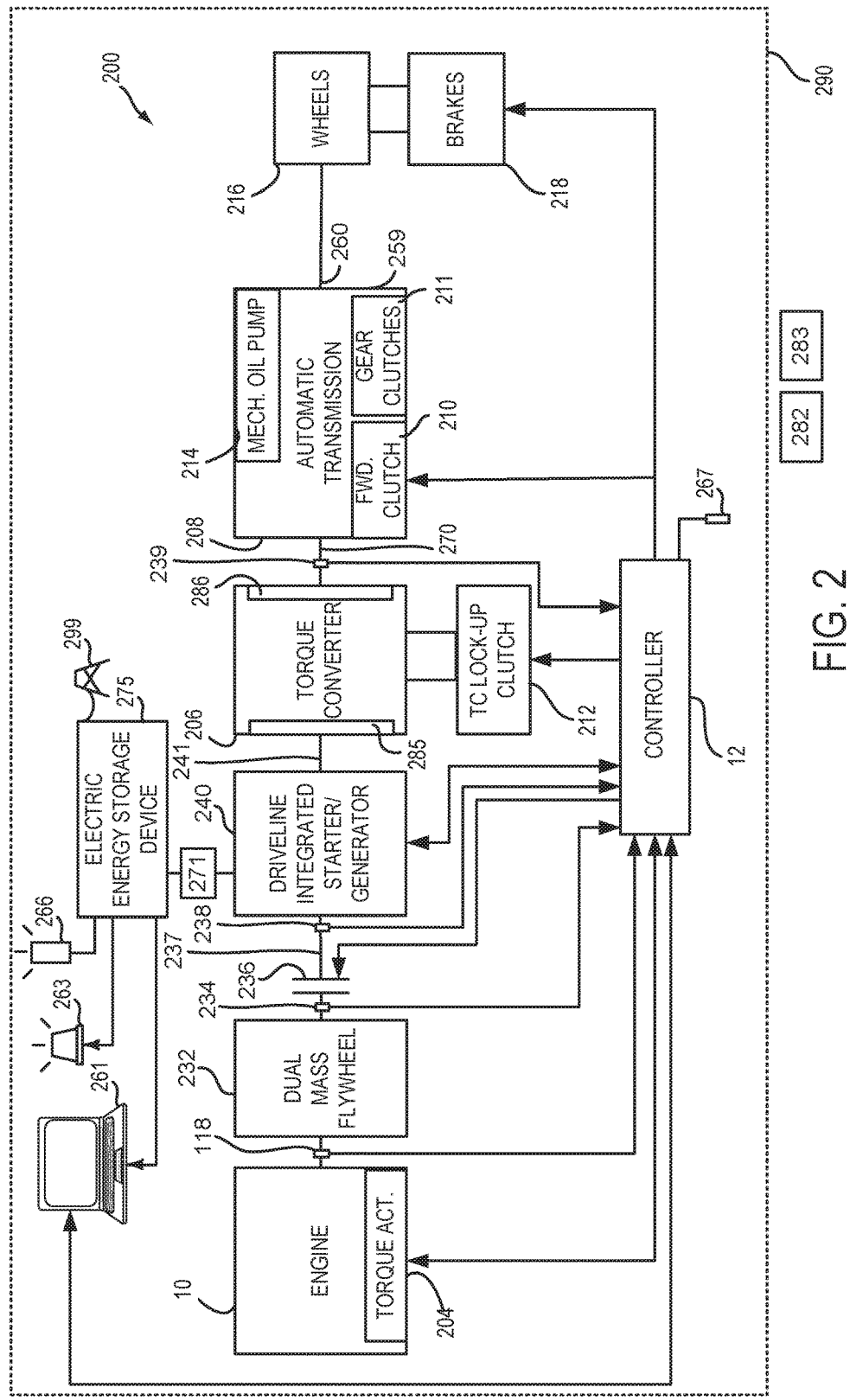
FIG. 2 shows a first example vehicle driveline configuration.
Figure 3:
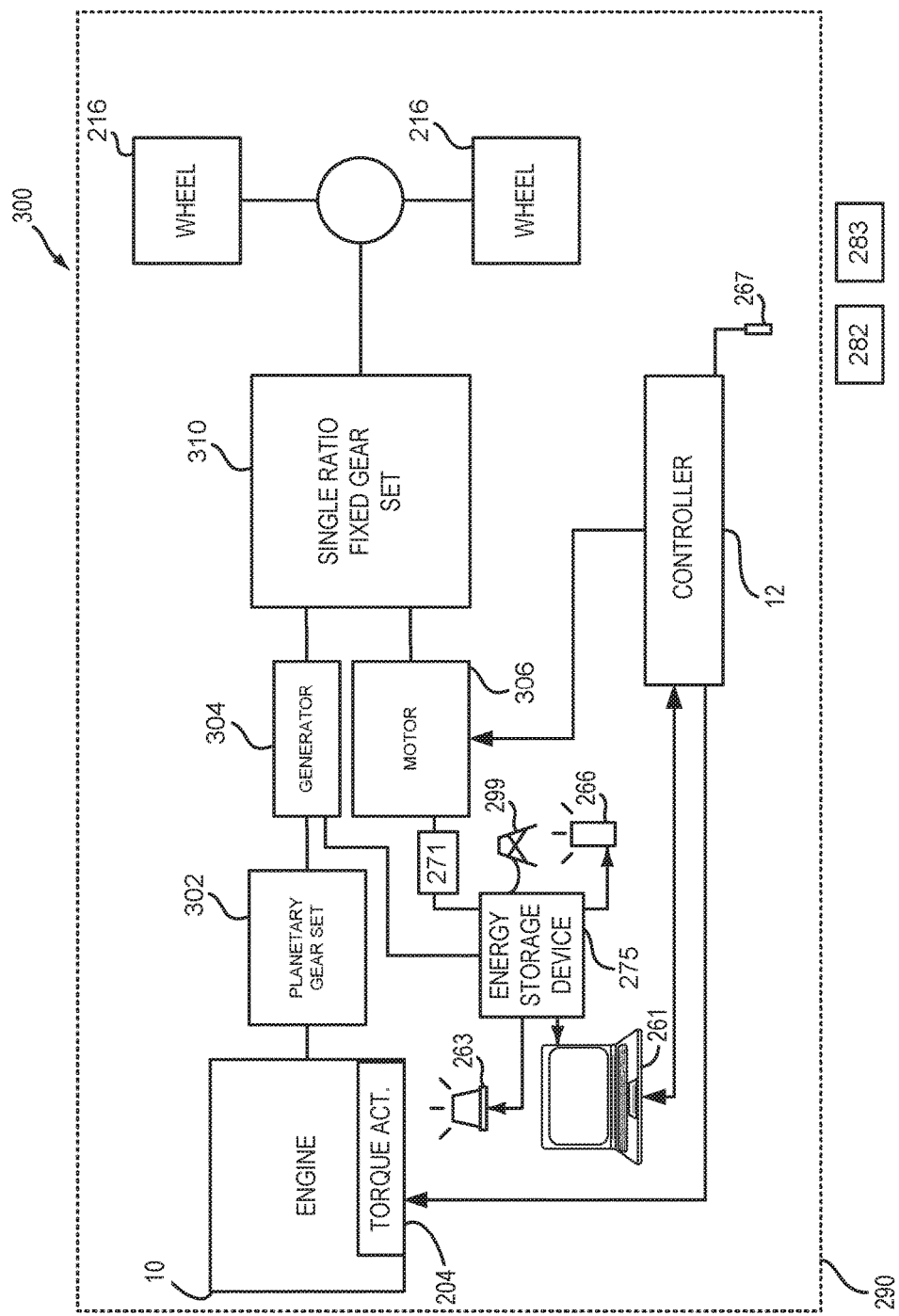
FIG. 3 shows a second example vehicle driveline configuration.
Figure 4:
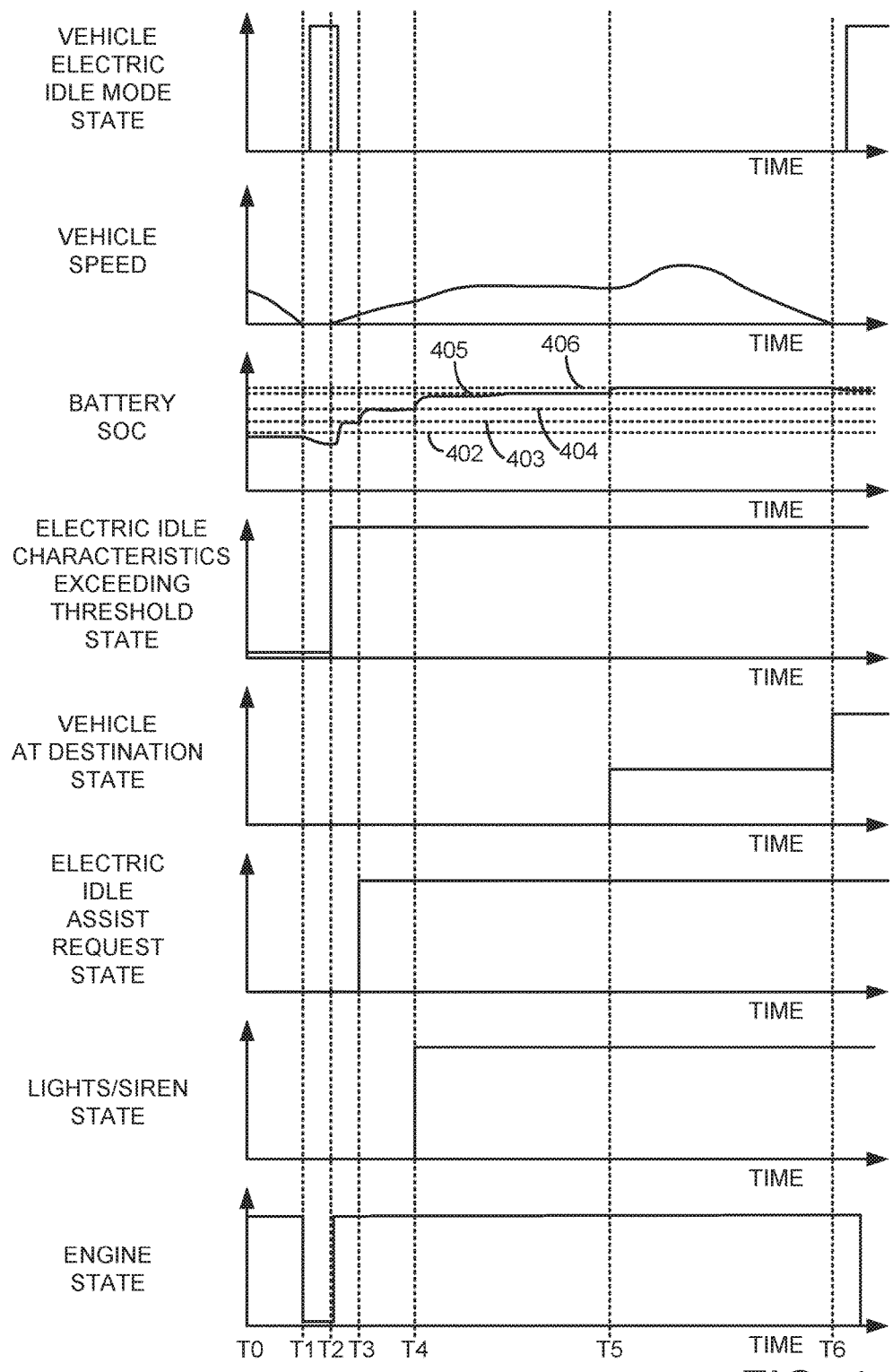
FIG. 4 shows an example vehicle operating sequence.
Figure 5:
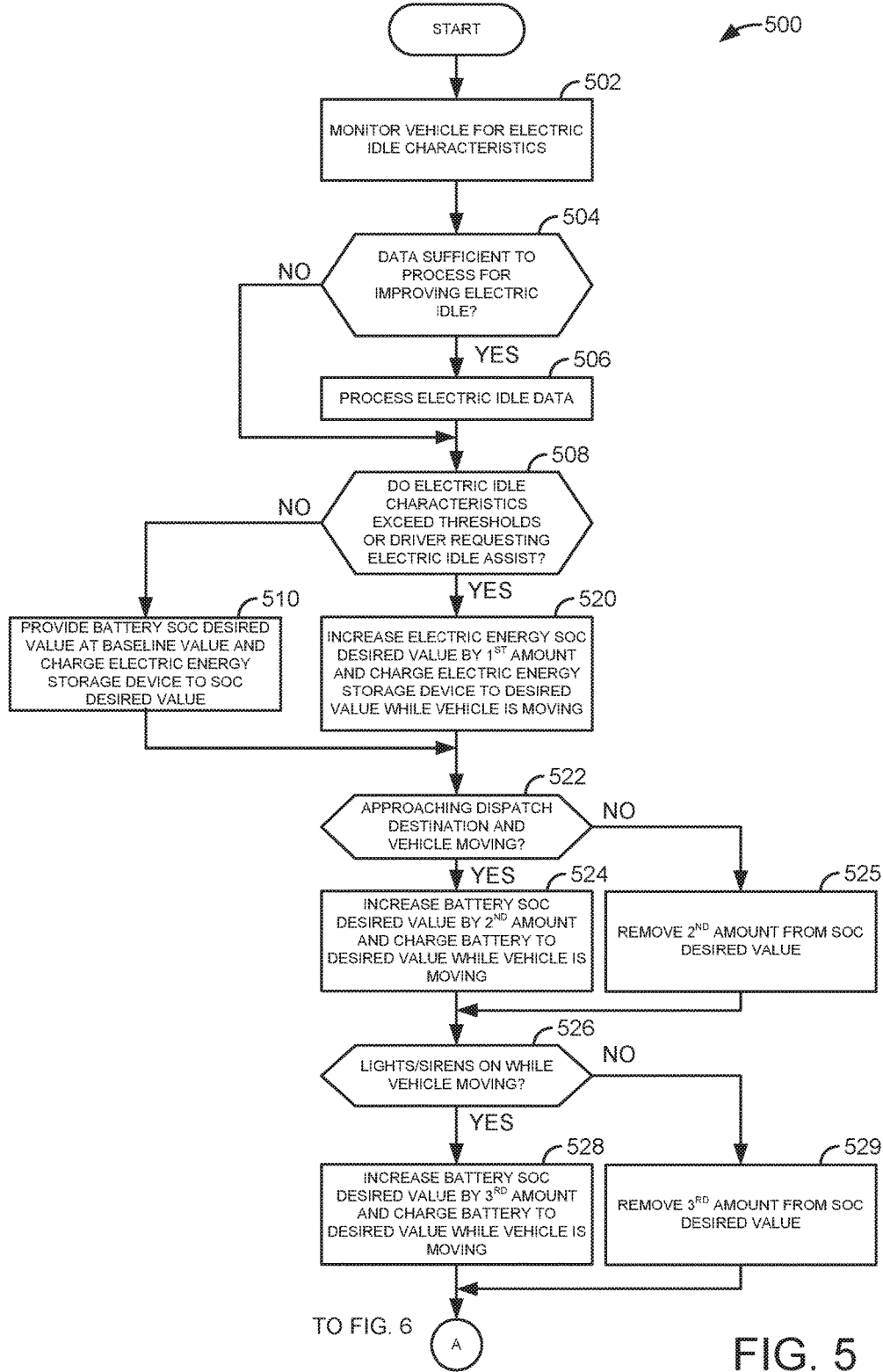
FIGS. 5 and 6 show an example method for operating a vehicle.
Figure 6:
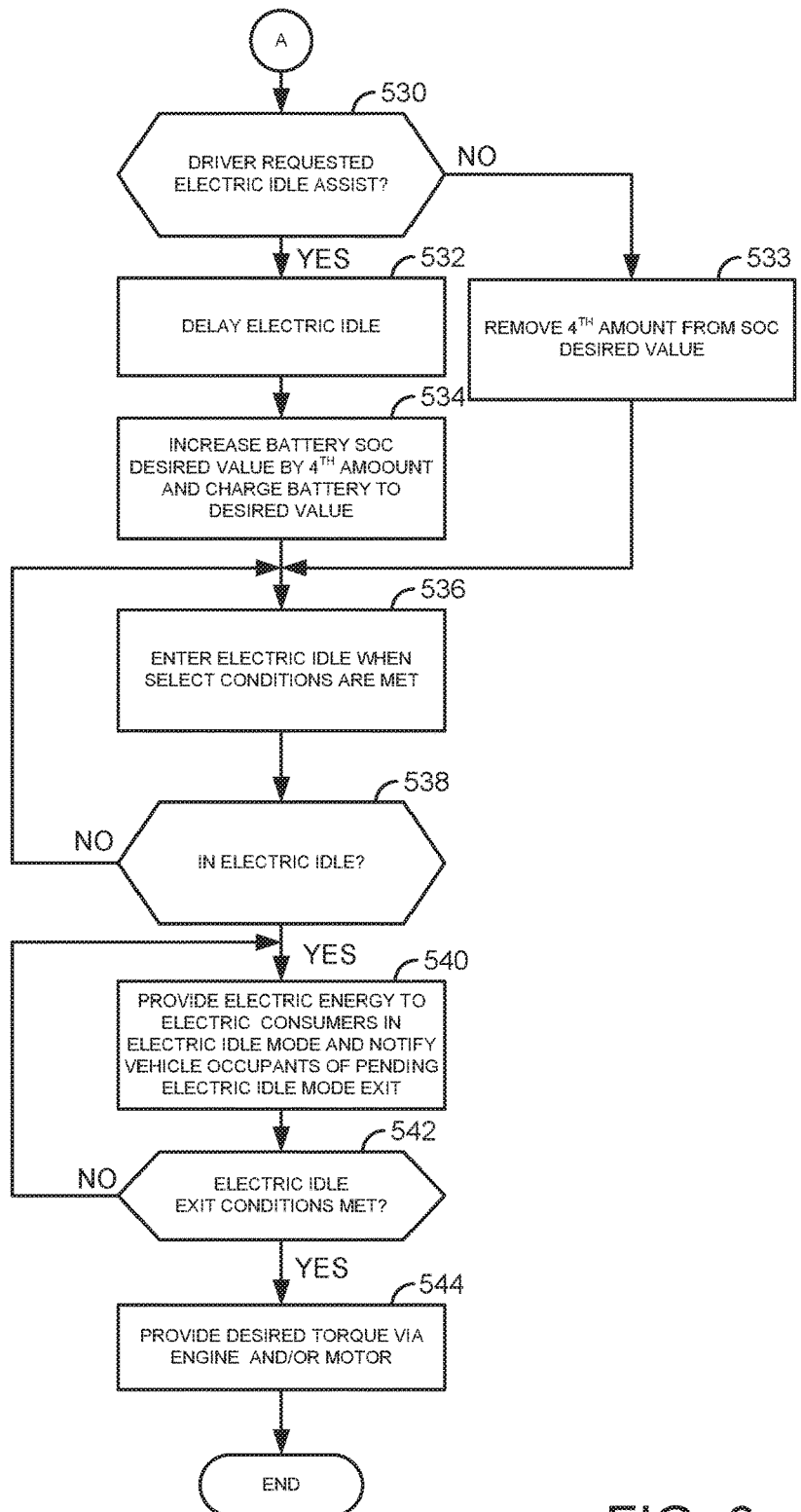

The present description is related to operating a vehicle in an electric idle mode and adjusting battery state of charge to extend the electric idle mode so as to reduce a number of engine starts that may result from operating the vehicle in the electric idle mode. The vehicle may include a hybrid vehicle driveline as shown in FIGS. 1-3. The vehicle may operate according to the vehicle operating sequence shown in FIG. 4. A method for adjusting operating the vehicle according to the sequence of FIG. 4 is shown in FIGS. 5 and 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to engine crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory (non-transient) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIGS. 2-3. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via driveline integrated starter/generator (DISG) 240. Further, engine 10 may generate or adjust torque via torque actuator 204, such as a fuel injector, throttle, camshaft, valve lift, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. Voltage controller 271 may boost voltage of energy storage device 275 to operate DISG 240. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor, and the electrical energy storage device 275 may be selectively coupled to a stationary electrical power grid 299 to recharge the electrical energy storage device 275. Electrical energy storage device may supply electrical power to electrical consumers including but not limited to human/machine interface and vehicle computer 261, emergency lighting (e.g., flashing or rotating red or blue lighting), audible siren 266, radio transmitter/receiver 267, and controller 12. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-N where N is an integer number between 4-25) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

Radio receiver/transmitter 267 may receive global positioning data from one or more satellites 283. Additionally, radio receiver/transmitter 267 may receive data from remote dispatcher 282. Data received from remote dispatcher 282 may include but is not limited to the vehicle's destination address, crime suspect names, vehicle license plate information, and other law enforcement data. Radio receiver/transmitter may transfer data to or from controller 12 and computer 261. Computer 261 may also serve as a human/machine interface. Human/machine interface may receive a request from a vehicle occupant to increase or decrease an electric idle duration or battery state of charge. Siren 266 may be activated by human/machine interface in response to a request made by a vehicle occupant. Similarly, emergency lighting (e.g., rotating or flashing red or blue lights) may be activated in response to a request made by a vehicle occupant.

Referring now to FIG. 3, an example of an alternative driveline 300 is shown. FIG. 3 includes some of the same devices that are shown in FIG. 2. Devices in FIG. 3 that have the same numerical labels as devices in FIG. 2 are the same devices and operate in the same way as the devices described in FIG. 2 unless indicated otherwise.

Driveline 300 includes engine 10 and torque actuator 204 as described in FIGS. 1 and 2. Engine 10 provides torque to planetary gear set 302 and generator 304 operates in a speed control mode to control engine torque delivery to single ratio gearing system 310. Output from generator 304 provides electrical energy to energy storage device 275 and motor 306. Electrical energy storage device 275 may supply electrical power to motor 306 via variable voltage controller 271 when engine 10 is not operating. Electrical energy storage device may be a battery, capacitor, or other electrical energy storage device, and electrical energy storage device 275 may be selectively electrically coupled to stationary power grid 299. Motor 306 may also be operated in a generator mode for regenerative braking. Torque from engine 10 and motor 306 may be combined in single ratio gearing system 10 to provide torque to vehicle wheels 216 via a mechanical power path. Controller 12 controls operation of engine 10, generator 304, and motor 306 to adjust power supplied to vehicle wheels 216. Thus, the driveline of FIG. 3 does not include a transmission with multiple fixed gear ratios for delivering engine and motor power to vehicle wheels.

Thus, the systems of FIGS. 1-3 provides for a vehicle system, comprising: an engine; a motor/generator in mechanical communication with the engine; and a controller including non-transitory executable instructions, which when executed by the controller, cause the controller to provide an electric idle mode for the motor/generator and the engine, the controller when the vehicle is in the electric idle mode providing an indication to vehicle occupants that the electric idle mode will be exited based on the occurrence of a condition. The vehicle system includes where the occurrence of the condition is an amount of time elapsing or an amount of electric energy storage device charge consumed. The vehicle system further comprises additional instructions to further delay exiting the electric idle mode in response to a vehicle occupant request to further delay exiting the electric idle mode. The vehicle system further comprises additional instructions to characterize a plurality of vehicle electric idle conditions in the vehicle electric idle mode as one or more numeric values and adjust an electric energy storage device state of charge in response to one or more of the numeric values exceeding one or more threshold values. The vehicle system includes where the vehicle electric idle mode is a mode where the vehicle's engine is off; the vehicle increases torque to vehicle wheels responsive to an application of an accelerator pedal, release of a brake pedal, or a vehicle occupant shifting a transmission; and a vehicle's electric energy storage device supplies electrical energy to devices of the vehicle being operated by a vehicle occupant. The vehicle system includes where the vehicle is not moving in the vehicle electric idle mode.

Referring now to FIG. 4, an example vehicle operating sequence for operating a vehicle in an electric idle mode is shown. The operating sequence may be provided by the method of FIGS. 5 and 6 in the systems of FIGS. 1-3. Vertical lines T0-T6 represent times of interest during the sequence.

The first plot from the top of FIG. 4 is a plot of vehicle electric idle mode state versus time. In one example vehicle electric idle mode state identifies a condition where the vehicle's engine is stopped; the vehicle increases torque to vehicle wheels responsive to an application of an accelerator pedal or an increase in a driveline torque request, release of a brake pedal, or a vehicle occupant shifting a transmission gear; and the vehicle's energy storage device supplies electrical energy to devices of the vehicle being operated by the occupant (e.g., emergency lights/siren, occupants portable computer, and vehicle radio). Further, in some examples electric idle mode may also include where the vehicle speed may be zero. In other examples, electric idle mode may also include where the vehicle speed is less than a threshold speed (e.g., 16 kilometer/hour). The vertical axis represents vehicle electric idle mode state and the vehicle is in electric idle mode state when the trace is at a higher level near the vertical axis arrow. The vehicle is not in the electric idle mode state when the electric idle mode state trace is at a lower level near the horizontal axis. The horizontal axis represents time and time increases from the left side of the figure to the right side of the figure.

The second plot from the top of FIG. 4 is a plot of vehicle speed versus time. The vertical axis represents vehicle speed and vehicle speed increases in the direction of the vertical axis arrow. The horizontal axis represents time and time increases from the left side of the figure to the right side of the figure.

The third plot from the top of FIG. 4 is a plot of battery state of charge versus time. The vertical axis represents electric energy device state of charge (SOC) and battery state of charge increases in the direction of the vertical axis arrow. The horizontal axis represents time and time increases from the left side of the figure to the right side of the figure. Horizontal line 402 represents a base target or desired SOC not to be exceeded unless special conditions exist. Horizontal line 403 represents a base target or desired SOC that has been increased in response to electric idle characteristics exceeding threshold conditions. Horizontal line 404 represents a base target or desired SOC that has been increased in response to electric idle characteristics exceeding threshold conditions and electric idle assist being requested by a vehicle occupant. Horizontal line 405 represents a base target or desired SOC that has been increased in response to electric idle characteristics exceeding threshold conditions, electric idle assist being requested by a vehicle occupant, and vehicle conditions (e.g., emergency lights and sirens) indicating a future electric idle event. Horizontal line 406 represents a base target or desired SOC that has been increased in response to electric idle characteristics exceeding threshold conditions, electric idle assist being requested by a vehicle occupant, and vehicle conditions (e.g., emergency lights and sirens) indicating a future electric idle event, and the vehicle arriving at a dispatched destination.

The fourth plot from the top of FIG. 4 is a plot of electric idle characteristics exceeding a threshold state versus time. The electric idle characteristics may include the parameters described subsequently in the description of FIG. 5 at 508. The vertical axis represents electric idle characteristics exceeding a threshold state and electric idle characteristics exceeding a threshold state is asserted when the trace is at a higher level near the vertical axis arrow. The electric idle characteristics exceeding a threshold state is not asserted when the trace is at a lower level near the horizontal axis. The horizontal axis represents time and time increases from the left side of the figure to the right side of the figure.

The fifth plot from the top of FIG. 4 is a plot of vehicle at destination state versus time. The vertical axis represents vehicle at destination state and the vehicle is at the destination when the trace is near the vertical axis arrow. The vehicle is farther than a threshold distance from its destination when the vehicle at destination state is at a low level near the horizontal axis. The vehicle is closer than the threshold distance to its destination when the vehicle at destination state is at a middle level between the horizontal axis and the vertical axis arrow. The horizontal axis represents time and time increases from the left side of the figure to the right side of the figure.

The sixth plot from the top of FIG. 4 is a plot of electric idle assist request state versus time. The vertical axis represents electric idle assist request state and electric idle assist request state is asserted when the trace is at a higher level near the vertical axis arrow. Electric idle assist request state may be based on a request from a vehicle occupant to increase the amount of battery charge available for electric idle assist so that the duration of electric idle assist may be increased. The electric idle assist request state is not asserted when the trace is at a lower level near the horizontal axis. The horizontal axis represents time and time increases from the left side of the figure to the right side of the figure.

The seventh plot from the top of FIG. 4 is a plot of light and/or siren state versus time. The vertical axis represents light/siren state and light/siren state is asserted when the trace is at a higher level near the vertical axis arrow. Light/siren state may be used as a basis for forecasting an electric idle mode may soon be entered since police and fire vehicles often stop traveling for an extended period of time after emergency lights and/or siren are activated. The emergency lights and siren are not active and the light/siren state is not asserted when the trace is at a lower level near the horizontal axis. The horizontal axis represents time and time increases from the left side of the figure to the right side of the figure.

The eighth plot from the top of FIG. 4 is a plot of engine state versus time. The vertical axis represents engine state and the engine is operating when the trace is at a level near the vertical axis arrow. The engine is not operating when the trace is at a level near the horizontal axis arrow. The horizontal axis represents time and time increases from the left side of the figure to the right side of the figure.

At time T0, the engine is operating (e.g., combusting air and fuel) the vehicle is not in electric idle mode and the vehicle speed is not zero. The electric idle characteristics are not exceeding threshold values and the electric energy storage device SOC is less than a base target or desired SOC threshold 402. The vehicle is farther than a threshold distance from its destination and vehicle occupants have not requested electric idle assist. Additionally, the vehicle emergency lights and siren are not operating. These vehicle operating conditions are based on the operating states shown.

At time T1, the vehicle stops in response to low driver demand torque and applied brakes (not shown) and the engine is stopped. Shortly thereafter, the vehicle enters electric idle mode as indicated by the vehicle electric idle mode state and electric energy storage device SOC begins to be reduced. The electric idle characteristics do not exceed threshold levels and the vehicle is more than a threshold distance from its destination. The vehicle occupants have not requested electric idle assist and the lights/siren are not activated.

At time T2, vehicle speed begins to increase in response to an increase in driveline torque or driver demand torque (not shown). The engine is restarted shortly thereafter in response to the increase in torque. The vehicle exits electric idle mode and the engine begins to increase the SOC via operating the electric machine as a generator or alternator. The electric idle characteristics exceed one or more threshold values as indicated by the electric idle characteristics exceeding threshold state. Consequently, the SOC is increased to level 402 by increasing the value of the base target by a threshold amount.

If one or more of the electric idle characteristics exceed its threshold value, it may be expected that the next time the vehicle enters electric idle mode, it may do so for longer than a threshold amount of time. Further, the particular vehicle may spend longer than a threshold amount of time in electric idle mode while the vehicle is activated.

At time T3, the vehicle is speed is increasing and the vehicle is not in an electric idle state. The electric idle characteristics exceed threshold values and the vehicle is not within a threshold distance of its destination. However, a vehicle occupant requests electric vehicle assist as indicate by the electric idle assist request state and the electric energy storage device SOC is increased a threshold amount to a level 404. The emergency lights and siren are not activated and the engine is operating.

A vehicle occupant may request electric vehicle assist to increase the amount of charge stored in the vehicle's electric energy storage device. By increasing the amount of change stored in the vehicle's electric energy storage device, it may be possible, at a time in the near future, to operate the vehicle in electric idle mode for a longer period of time and/or the electric energy storage device may supply more electrical energy to electrical energy consumers for a longer period of time. Additionally, it may be possible for the vehicle to travel a longer distance while silently approaching (e.g., engine off, motor on) a destination or target for surveillance.

At time T4, the vehicle speed continues increasing and the vehicle is not in an electric idle state. The electric idle characteristics exceed threshold values and the vehicle is not within a threshold distance of its destination. The electric vehicle assist request remains active and the emergency lights/sirens are activated. The electric energy storage device SOC is increased a threshold amount to a level 405 in response to activating the emergency lights/siren indicated by the light/siren state. The engine continues operating.

The vehicle's emergency lights and/or siren may be indicators that the vehicle will soon reach a destination where the vehicle will enter electric idle mode for an extended period of time while the occupant (e.g., police or fire official) tends to work in or outside of the vehicle while vehicle electrical consumers are supplied electrical energy via the vehicle's electric energy storage device. Therefore, the vehicle's emergency lights and/or siren may be a good prognosticator of an impending electric idle. As such, electric energy storage device SOC may be increased to extend the amount of time the vehicle may be in electric idle mode without restarting the vehicle's engine.

At time T5, the vehicle is speed has leveled off and the vehicle is not in an electric idle state. The electric idle characteristics exceed threshold values and the vehicle is within a threshold distance of its destination as indicated by the vehicle at destination state. The electric vehicle assist request remains active and the emergency lights/sirens are activated. The electric energy storage device SOC is increased a threshold amount to a level 406 in response to the vehicle being within a threshold distance of its destination. The emergency lights/siren remain active and the engine continues operating.

If the vehicle is within a threshold distance of its dispatched destination (e.g., destination received from a remote dispatcher), it may be expected that the vehicle will enter an extended period of electric idle mode. Therefore, the electric energy storage device SOC may be increased before the vehicle reaches its dispatched destination so that it may stay in electric idle mode for a longer period of time before the engine is restarted to charge the vehicle's battery. In this way, the vehicle's fuel may be conserved and the vehicle's occupants may be disturbed by less frequent engine starting. Further, the vehicle engine may operate less so that vehicle occupants may be disturbed less by engine noise and vibration.

At time T6, the vehicle's speed reduced to zero and shortly thereafter the vehicle enters an electric idle state. The electric idle characteristics exceed threshold values and the vehicle is at its destination. The electric vehicle assist request remains active and the emergency lights/sirens are activated. The engine is stopped and the electric energy storage device SOC begins to be reduced as the vehicle's electric energy device supplies electrical power to electrical consumers (e.g., emergency lights/sirens, vehicle radio, and occupant's portable computer).

Referring now to FIGS. 5 and 6, an example method for operating a vehicle driveline is shown. The method of FIGS. 5 and 6 may be included in the systems of FIGS. 1-3 as instructions stored in non-transitory memory. Further, the method of FIGS. 5 and 6 may include physical actions taken by a controller and/or various actuators to transform operating states of the vehicle.

At 502, method 500 monitors vehicle conditions and/or parameters for electric idle characteristics. In one example, the vehicle may monitor and store to memory an amount of time a vehicle is activated and in electric idle mode. The vehicle may also monitor an amount of time the vehicle is activated and in any mode. The monitoring may be for a prescribed duration (e.g., the vehicle being active for 6 hours). A percentage of a total time the vehicle is activated and in electric idle mode may be determined by dividing the amount of time the vehicle is activated and in electric idle mode by the amount of time the vehicle is activated.

The vehicle may be activated via a command from a driver or occupant. The vehicle may be propelled via a motor, an engine, or a combination of the motor and the engine when the vehicle is activated. The motor and engine do not need to be rotating while the vehicle is activated. In one example, the vehicle is activated by a driver turning a key or pressing a push button. The vehicle may be deactivated by turning the key or pressing the push button.

The amount of electrical power consumed by the vehicle's electrical devices may also be monitored via the controller 12 when the vehicle is in electric idle mode and activated. The amount of electrical power consumed by electrical consumers of the vehicle while the vehicle is in electric idle mode may also be determined as a function of ambient temperature.

The vehicle conditions and parameters may be monitored continuously and stored in groups containing a predetermined number of entries. The data in the groups may represent data for a predetermined amount of time (e.g., 6 hours of vehicle activation time). Method 500 proceeds to 504 after vehicle conditions are monitored and stored to controller memory.

At 504, method 500 judges if the amount of data stored in memory is sufficiently large to process. In one example, the amount of data is sufficiently large to process if the vehicle has been activated and monitoring parameters for longer than a threshold amount of time (e.g., 6 hours). In another example, the data is large enough if the number of electric idle events has exceeded a threshold. If method 500 judges that the amount of data stored in memory is sufficiently large to process, the answer is yes and method 500 proceeds to 506. Otherwise, the answer is no and method 500 proceeds to 508.

At 506, method 500 processes the data stored to memory. In one example, method 500 determines a percent of actual total time in electric idle mode by dividing the amount of time the vehicle is activated and in electric idle mode by the amount of time the vehicle is activated. Further, method 500 determines the duration of each entry into electric idle mode and an amount of electrical power consumed versus ambient temperature each time the vehicle is in electric idle mode. Electrical power provided to vehicle electric consumers may be determined via a current sense resistor or other known current monitoring device. Method 500 also determines averages and standard deviations for each of the above mentioned data set collected. For example, if the vehicle enters electric idle mode six times over a prescribed time or event interval, method 500 provides averages and standard deviation of percent of time in electric idle mode, average and standard deviation of percent of total time in electric idle mode, and average and standard deviation of electrical power consumed in electric idle mode.

Method 500 also determines weighted moving averages of percent of time in electric idle mode, total time in electric idle mode, and electrical power consumed in electric idle mode (e.g., numeric values). The exponentially weighted moving averages may be determined based on the equation:

$$\sigma_t^2 = \lambda \sigma_{t-1}^2 + (1-\lambda) x_{t-1}^2$$

where $\sigma_t$ is the exponentially weighted moving average, $\lambda$ is an empirically determined smoothing parameter, t is time, and $x_t$ is the value of the time series at time t (e.g., value of the percent of time in electric idle mode at time t). The exponentially weighted moving averages are compared to predetermined thresholds. For example, the exponentially weighted average of percent of time in electric idle mode is compared to a first threshold. The exponentially weighted average of length of each time the vehicle enters electric idle mode is compared to a second threshold. The exponentially weighted average of electric power consumed by vehicle electric power consumers each time the vehicle enters electric idle mode is compared to a third threshold. Method 500 proceeds to 508 after electric idle data is processed.

At 508, method 500 judges if the electric idle characteristics determined at 504 and 506 exceed the respective thresholds described at 506. For example, method 500 determines if the exponentially weighted average of percent of time in electric idle mode exceeds the first threshold. Further, method 500 may judge if a vehicle occupant is requesting electric idle mode assistance. A vehicle occupant may request electric idle assistance via a human/machine interface. If either condition is present, the answer is yes and method 500 proceeds to 520. Otherwise, the answer is no and method 500 proceeds to 510.

Electric idle characteristics exceeding one or more threshold values may be used to estimate that a vehicle operating in an electric idle mode at a future time will exceed a threshold time duration, or alternatively, a charge consumption threshold amount. Therefore, it may be desirable to increase the electric energy stored device SOC desired value so electric energy storage device SOC may be increased before the vehicle enters an electric idle mode. In some examples, the electric energy stored device SOC desired value may be an upper SOC threshold limit not to be exceeded. In this way, conditions during past electric idle conditions may be a basis to determine if the vehicle may be at conditions that are desirable for electric idle mode for longer than a threshold amount of time or where more than a threshold amount of electric energy storage device charge is consumed.

At 510, method 500 provides an electric energy storage device state of charge (SOC) desired value at a baseline value and controller 12 maintains electric energy storage device SOC at or below the electric energy storage device SOC desired value. In one example, the baseline value for the electric energy storage device SOC target is 65% of electric energy storage device SOC maximum (e.g., 100% electric energy storage device SOC). The baseline electric energy storage device SOC target value is a value of SOC that the electric energy storage device may be repeatedly charged to with a low amount of electric energy storage device degradation. The electric energy device SOC may vary based on vehicle operating conditions, but the SOC is prevented from exceeding the electric energy storage device SOC desired value unless the desired value is increased by an adder or modifier at 524, 528, and 534. Additionally, method 500 may provide an electric energy storage device SOC lower threshold limit at a baseline value and controller 12 may maintain electric energy storage device SOC at or above the lower threshold limit. In one example, the baseline value for the electric energy storage device SOC lower limit is 35% of electric energy storage device SOC maximum. The baseline electric energy storage device SOC lower limit value is a value of SOC that the electric energy storage device may be repeatedly depleted to with a low amount of electric energy storage device degradation. Further, the first amount of charge described at 520 is removed from the baseline electric energy storage device SOC desired value and lower threshold limits. Method 500 proceeds to 522 after baseline desired value and lower SOC limit values are provided.

At 520, method 500 increases the electric energy storage device SOC desired value by a first amount of charge (e.g., 2% of maximum SOC) to increase an amount of electric energy available during electric idle mode. Additionally, the electric energy storage device lower SOC threshold limit may be decreased by the first amount of charge or a different amount to extend electric energy charge depletion during electric idle mode. Thus, if the electric idle characteristics are exceeded at 508, the amount of charge available during electric idle mode is increased to reduce a number of engine restarts to charge the electric energy storage device. Further, increasing the amount of charge available to electric consumers may increase a distance a vehicle may travel to approach a destination in a silent run mode. Method 500 also increases the electric energy storage device SOC to the level of the electric energy storage device SOC desired value via regenerative braking or converting the engine's mechanical energy into stored electrical energy via the motor/generator before the vehicle enters electric idle mode. Method 500 proceeds to 522 after the electric energy storage device SOC desired value and/or lower threshold SOC limits are adjusted.

In some examples, the engine output power may be increased to a power where engine efficiency is greater than if the engine is operating at a base (e.g., warmed up) idle speed. For example, the engine may be operated in a region where engine efficiency is within 10% of maximum engine efficiency so that the time to charge the energy storage device may be reduced. The engine power may be increased at a predetermined rate when charging begins. Further, engine power may be decreased at a predetermined rate when charging ends. In these ways, energy storage device charging may be made to be less objectionable to vehicle occupants. Further, the electric energy storage device SOC desired value may be increased by a first amount a first time an engine of the vehicle starts when the vehicle has not moved. The electric energy storage device SOC desired value may be increased by a second amount a second time an engine of the vehicle starts when the vehicle has not moved, the second amount greater than the first amount.

At 522, method 500 judges if the vehicle is within a threshold distance of a dispatched destination. A dispatched destination is a destination that is received from a remote source other than the vehicle occupants. For example, a dispatched destination may be a location of a crime or fire. In one example, method 500 determines the vehicle's present position via a global positioning system and the destination from coordinates provided by a remote dispatcher. Method 500 then determines the distance between the vehicle's present position and the destination coordinates via maps stored in vehicle controller 12 or another processor in the vehicle as is known in the art. If the distance between the vehicle's present position and the destination coordinates is less than a threshold, the answer is yes, and method 500 proceeds to 524. Otherwise, the answer is no and method 500 proceeds to 525.

At 524, method 500 increases the electric energy storage device SOC desired value by a second amount of charge (e.g., 3% of maximum SOC) to increase an amount of electric energy available during electric idle mode. Additionally, the electric energy storage device SOC lower threshold limit may be decreased by the second amount of charge or a different amount to extend electric energy charge depletion during electric idle mode. Thus, if the vehicle is within a threshold distance of a dispatched destination, the amount of charge available during electric idle mode is increased via adjusting the electric energy storage device SOC desired value and lower threshold limit to reduce a number of engine restarts to charge the electric energy storage device. Further, increasing the amount of electric charge available to electric consumers may increase a distance a vehicle may travel to approach a destination in a silent run mode. In some examples, the second amount may be based on whether or not the first amount at 520 has been provided to adjust the electric energy storage device SOC desired value and lower limit. For example, if the first amount has been provided to adjust the electric energy storage device SOC desired value and lower threshold limit, the second amount may be 0.5%. However, if the first amount has not been provided to adjust the electric energy storage device SOC desired value and lower threshold limit, the second amount may be 3% of maximum SOC. Method 500 also increases the electric energy SOC to the level of the electric energy storage device SOC desired value via regenerative braking or converting the engine's mechanical energy into stored electrical energy via the motor/generator before the vehicle enters electric idle mode. Method 500 proceeds to 526 after the electric energy storage device SOC desired value and/or lower threshold limit are adjusted.

At 525, method 500 decreases the electric energy storage device SOC desired value by the second amount of charge described at 524 to lower an amount of electric energy available during electric idle mode if the electric energy storage device SOC desired value and lower limit have been previously adjusted by the second amount of charge. Therefore, if the vehicle leaves its dispatched destination and is not within a threshold distance of a newly dispatched destination, the electric energy storage device SOC desired value and lower limit may be revised to reduce the possibility of long term battery degradation. Method 500 proceeds to 526 after the electric energy storage device SOC desired value and/or lower threshold limit are adjusted.

At 526, method 500 judges if the vehicle's emergency lights and/or siren are active while the vehicle is moving. The vehicle's emergency lights (e.g., red and/or blue flashing or rotating lights) may provide advanced information of the vehicle entering an electric idle mode since emergency vehicles often stay at a destination of an emergency for an extended duration. It may be determined that a vehicle's emergency lights and/or siren are active when a voltage related to the vehicle's emergency lights and/or siren is input to a controller. If method 500 judges that the vehicle's emergency lights and/or siren are active, the answer is yes, and method 500 proceeds to 528. Otherwise, the answer is no and method 500 proceeds to 529.

At 528, method 500 increases the electric energy storage device SOC desired value by a third amount of charge (e.g., 1% of maximum SOC) to increase an amount of electric energy available during electric idle mode. Additionally, the electric energy storage device SOC lower threshold limit may be decreased by the third amount of charge or a different amount to extend electric energy charge depletion during electric idle mode. Thus, if the vehicle's emergency lights or siren are activated, the amount of charge available during electric idle mode is increased to reduce a number of engine restarts to charge the electric energy storage device. Further, increasing the amount of charge may increase a distance a vehicle may travel to approach a destination in a silent run mode. In some examples, the third amount may be based on whether or not the first amount at 520 has been provided to adjust the electric energy storage device SOC desired value and lower limit. For example, if the first amount has been provided to the electric energy storage device SOC desired value and lower limit, the third amount may be 0.5%. However, if the first amount has not been provided to the electric energy storage device SOC desired value and lower limit, the second amount may be 1% of maximum SOC. Method 500 also increases the electric energy SOC to the level of the electric energy storage device SOC desired value via regenerative braking or converting the engine's mechanical energy into stored electrical energy via the motor/generator before the vehicle enters electric idle mode. Method 500 proceeds to 530 after the electric energy storage device desired value and/or lower threshold SOC limit are adjusted.

At 529, method 500 decreases the electric energy storage device SOC desired value by the third amount of charge described at 524 to lower an amount of electric energy available to electric consumers during electric idle mode if the electric energy storage device SOC desired value and lower threshold limit have been previously increased by the third amount of charge. Therefore, if the vehicle's emergency lights and/or siren are deactivated after a vehicle leaves its destination, the electric energy storage device SOC desired value and lower threshold limit may be revised to reduce the possibility of long term electric energy storage device degradation. Method 500 proceeds to 530 after the electric energy storage device SOC desired value and/or lower threshold limit are adjusted.

At 530, method 500 judges if a driver or vehicle occupant has requested electric idle assist or a request to increase a distance the vehicle may travel in a run silent mode. In one example, the driver or occupant may request electric idle assist and/or increased travel distance in run silent mode via a human/machine interface. Electric idle assist may increase an amount of charge that may be provided to vehicle electric consumers when a vehicle is in an electric idle mode. The vehicle may be in a run silent mode when a driver or vehicle occupant requests a run silent mode where the engine is not restarted to charge the electric energy storage device without at least providing advanced notice to vehicle occupants that the vehicle's engine will restart in a predetermined amount of time or after a predetermined amount of charge from the electric energy storage device is consumed. By operating the vehicle in a run silent mode, the motor may propel the vehicle to its destination without the engine being started and increasing noise emanating from the vehicle. In run silent mode, vehicle speed may be limited to less than a threshold speed since only motor torque is available in run silent mode. If method 500 judges that a vehicle occupant has requested electric idle assist or an increase in a distance the vehicle may travel in a run silent mode, the answer is yes, and method 500 proceeds to 532. Otherwise, the answer is no and method 500 proceeds to 533.

At 532, method 500 delays electric idle mode for a predetermined amount of time after conditions are present that allow the vehicle to enter electric idle mode. In one example, electric idle mode may be entered when vehicle speed is less than a threshold speed, the driver demand torque is less than a threshold driver demand torque, and electric energy storage device SOC is greater than a threshold. By delaying entry into electric idle mode, electric energy storage device charge may be conserved so that the vehicle's engine is restarted fewer times while the vehicle is stopped or at low driver demand conditions. Method 500 proceeds to 534 after delaying entry into electric idle mode.

At 534, method 500 increases the electric energy storage device SOC desired value by a fourth amount of charge (e.g., 3% of maximum SOC) to increase an amount of electric energy available during electric idle mode and/or run silent mode. Additionally, the electric energy storage device SOC lower threshold limit may be decreased by the fourth amount of charge or a different amount to extend electric energy charge depletion during electric idle mode and/or run silent mode. Thus, if a vehicle occupant request electric idle assist or increased travel distance in a run silent mode, the amount of charge available to electrical consumers during electric idle mode and run silent mode is increased to reduce a number of engine restarts to charge the electric energy storage device and increase vehicle travel distance on electrical charge. In some examples, the fourth amount may be based on whether or not the first amount at 520 has been provided to adjust the electric energy storage device SOC desired value and lower limit. For example, if the first amount has been provided to the electric energy storage device SOC desired value and lower limit, the fourth amount may be 1.5%. However, if the first amount has not been provided to the electric energy storage device SOC desired value and lower limit, the second amount may be 3% of maximum SOC. Method 500 also increases the electric energy SOC to the level of the electric energy storage device SOC desired value via regenerative braking or converting the engine's mechanical energy into stored electrical energy via the motor/generator before the vehicle enters electric idle mode. Method 500 proceeds to 536 after the electric energy storage device desired value and/or lower threshold SOC limit are adjusted.

At 533, method 500 decreases the electric energy storage device SOC desired value by the fourth amount of charge described at 524 to lower an amount of electric energy available to electric consumers during electric idle mode if the electric energy storage device SOC desired value and lower threshold limit have been previously increased by the fourth amount of charge. Therefore, if vehicle occupants do not request electric idle assist or increasing the distance the vehicle may travel in run silent mode, the electric energy storage device SOC desired value and lower threshold limit may be revised to reduce the possibility of long term electric energy storage device degradation. Method 500 proceeds to 536 after the electric energy storage device SOC desired value and/or lower threshold limit are adjusted.

At 536, the vehicle may enter electric idle mode when select conditions are met. In one example, the select conditions may be driver demand torque less than a threshold, vehicle speed less than a threshold, and electric energy conversion device SOC greater than a threshold. In electric idle mode, the vehicle's electric energy storage device provides electrical energy to vehicle electrical consumers including but not limited to human/machine interfaces, the driveline motor, computers, radios, lights, and sirens while the vehicle is activated. The vehicle may be activated via a pushbutton or human/machine interface. The vehicle may travel down a road under power from the vehicle's driveline when the vehicle is activated. However, the vehicle does not have to move when activated. Method 500 proceeds to 538.

At 538, method 500 judges if the vehicle is in electric idle mode. In one example, a bit in memory indicates whether or not the vehicle is operating in electric idle mode. If the vehicle is operating in electric idle mode, the answer is yes and method 500 proceeds to 540. Otherwise, the answer is no and method 500 returns to 536.

At 540, method 500 provides electric energy to electric consumers of the vehicle via the electrical energy storage device. The vehicle's electric consumers may include but are not limited to the driveline motor, human/machine interfaces, computers, lights, radios, and sirens. The electrical consumers may be selectively activate and deactivated by vehicle occupants and/or a vehicle controller. Method 500 proceeds to 542 after providing electrical energy to the vehicle's electric consumers.

At 542, method 500 judges if conditions are present to exit electric idle mode and/or run silent mode. Electric idle mode may be exited in response to a driver demand torque exceeding a threshold and/or electric energy storage device SOC being less than or equal to the electric energy storage device SOC lower threshold limit. Similarly, run silent mode may be exited in response to driver demand torque greater than a threshold and/or other conditions. If method 500 judges that conditions are present to exit electric idle mode or run silent mode, the answer is yes and method 500 proceeds to 544. Otherwise, the answer is no and method 500 returns to 540.

If electric energy conversion device SOC is approaching the electric energy conversion device SOC lower threshold limit while the vehicle is in electric idle mode, vehicle occupants may be notified that the electric idle mode may be exited after a threshold amount of charge from the electric energy conversion device is consumed or after a threshold time duration has passed. In this way, vehicle occupants may be notified before the vehicle exits electric idle mode so that engine starting is not a surprise to vehicle occupants.

Similarly, if electric energy conversion device SOC is approaching the electric energy conversion device SOC lower threshold limit while the vehicle is in a run silent mode, vehicle occupants may be notified that the run silent mode may be exited after a threshold amount of charge from the electric energy conversion device is consumed or after a threshold time duration has passed. In this way, vehicle occupants may be notified before the vehicle exits run silent mode so that engine starting is not a surprise to vehicle occupants. In still other examples, vehicle occupants may be given an opportunity to delay exiting run silent mode so that the engine is not started to alert subjects being approached by the vehicle. For example, occupants may further extend run silent mode to a limit that is lower than the electrical energy storage device SOC lower threshold limit. The reason that it may be possible to reduce the lower SOC lower threshold is because the SOC lower threshold may have a significant margin to be lowered due to pre-existing factors for durability and drivability.

At 544, method 500 provides a desired driver demand torque via the engine and/or the motor. Further, method 500 may begin charging the electric energy storage device via the engine and the motor/generator. Method 500 exits after providing the desire driver demand torque.

In this way, electric energy storage device SOC upper and lower limits may be adjusted so that a duration of electric idle mode may be extended so that an engine starts fewer times to provide electrical energy to electric consumers via the motor/generator while the vehicle is at conditions that may permit electric idle. Further, electric energy storage device SOC desired value and lower limit may be adjusted so that the vehicle may travel farther in a run silent mode where the engine is not activated.

Thus, the method of FIGS. 5 and 6 provides for a method for operating a vehicle, comprising: estimating whether or not a future vehicle electric idle will exceed a threshold duration or energy consumption amount; adjusting a value of an electric energy storage device state of charge (SOC) desired value responsive to an estimate that the future vehicle electric idle will exceed the threshold duration or energy consumption amount; and adjusting an electric energy storage device SOC to the electric energy storage device SOC desired value via the controller. The method includes where the electric energy storage device SOC is adjusted via increasing output of an alternator or generator, and further comprises increasing the electric energy storage device SOC desired value to a higher value and operating an engine at a power where engine efficiency is greater than at engine idle conditions.

In some examples, the method further comprises receiving a request from a vehicle occupant to increase the duration of a future electric idle while the vehicle is moving or stationary and adjusting the value of the electric energy storage device SOC desired value responsive to the request from the vehicle occupant. The method includes where the estimate is based on a dispatched vehicle destination for the vehicle, and further comprises increasing engine power at a desired rate when an engine is started to increase the electric energy storage device SOC, and decreasing engine power at a desired rate when the electric energy storage device SOC is at the electric energy storage device SOC desired value. The method includes where the estimate is based on whether or not emergency lighting or a siren is activated while the vehicle is moving, and further comprises increasing the electric energy storage device SOC desired value by a first amount a first time an engine of the vehicle starts when the vehicle has not moved, and increasing the electric energy storage device SOC desired value by a second amount a second time an engine of the vehicle starts when the vehicle has not moved. The method includes where adjusting the electric energy storage device SOC desired value includes increasing a value of the electric energy storage device SOC desired value when the estimate of the future vehicle electric idle exceeds the threshold. The method includes where adjusting the electric energy storage device SOC desired value includes decreasing a value of the electric energy storage device SOC desired value when the estimate of the future vehicle electric idle does not exceed the threshold.

The method of FIGS. 5 and 6 also provides for a method for operating a vehicle, comprising: characterizing a plurality of vehicle electric idle conditions in a vehicle electric idle mode as one or more numeric values; and adjusting electric energy storage device state of charge in response to one or more of the numeric values exceeding one or more threshold values. The method includes where the plurality of vehicle electric idle conditions includes a percent of total vehicle activation time spent in a vehicle electrical idle mode. The method includes where the vehicle electric idle mode is a mode where the vehicle's engine is off; the vehicle increases torque to vehicle wheels responsive to an application of an accelerator pedal, release of a brake pedal, or a vehicle occupant shifting a transmission; and the vehicle's electric energy storage device supplies electrical energy to devices of the vehicle being operated by a vehicle occupant. The method includes where the characterizing includes determining an average and standard deviation of each of the plurality of vehicle electric idle conditions.

In some examples, the method includes where adjusting the electric energy storage device state of charge includes increasing the electric energy storage device state of charge. The method includes where adjusting the electric energy storage device state of charge includes reducing the electric energy storage device state of charge. The method further comprises increasing the electric energy storage device state of charge in response to a request to extend a vehicle electric idle time requested by a vehicle occupant.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
   estimating whether or not a future vehicle electric idle will exceed a threshold energy consumption amount;
   adjusting a value of an electric energy storage device state of charge (SOC) desired value responsive to an estimate that the future vehicle electric idle will exceed the threshold energy consumption amount; and
   adjusting an electric energy storage device SOC to the electric energy storage device SOC desired value via a controller, where the electric energy storage device SOC is adjusted via increasing output of an alternator or a generator, and further comprising increasing the electric energy storage device SOC desired value to a higher value and operating an engine at a power where engine efficiency is greater than at engine idle conditions.

2. The method of claim 1, where the estimate is based on a dispatched vehicle destination for the vehicle, and further comprising increasing engine power at a desired rate when the engine is started to increase the electric energy storage device SOC, and decreasing engine power at a desired rate when the electric energy storage device SOC is at the electric energy storage device SOC desired value.

3. The method of claim 1, where the estimate is based on whether or not emergency lighting or a siren is activated while the vehicle is moving, and further comprising increasing the electric energy storage device SOC desired value by a first amount a first time the engine of the vehicle starts when the vehicle has not moved, and increasing the electric energy storage device SOC desired value by a second amount a second time the engine of the vehicle starts when the vehicle has not moved.

4. The method of claim 1, where adjusting the value of the electric energy storage device SOC desired value includes increasing the value of the electric energy storage device SOC desired value when the estimate of the future vehicle electric idle exceeds the threshold energy consumption amount.

5. The method of claim 1, where adjusting the value of the electric energy storage device SOC desired value includes decreasing the value of the electric energy storage device SOC desired value when the estimate of the future vehicle electric idle does not exceed the threshold energy consumption amount.

6. A method for operating a vehicle, comprising:
   estimating whether or not a future vehicle electric idle will exceed a threshold energy consumption amount;
   adjusting a value of an electric energy storage device state of charge (SOC) desired value responsive to an estimate that the future vehicle electric idle will exceed the threshold energy consumption amount; and
   adjusting an electric energy storage device SOC to the electric energy storage device SOC desired value via a controller, the method further comprising receiving a request from a vehicle occupant to increase a duration of electric idle time while the vehicle is moving or stationary and adjusting the value of the electric energy storage device SOC desired value responsive to the request from the vehicle occupant.

7. A method for operating a vehicle, comprising:
   characterizing a plurality of vehicle electric idle conditions in a vehicle electric idle mode as one or more numeric values, the plurality of vehicle electric idle conditions including a percent of total vehicle activation time spent in the vehicle electric idle mode; and
   adjusting an electric energy storage device state of charge in response to one or more of the numeric values exceeding one or more threshold values.

8. The method of claim 7, where the vehicle electric idle mode is a mode where a vehicle's engine is off; the vehicle increases torque to vehicle wheels responsive to an application of an accelerator pedal, release of a brake pedal, or a vehicle occupant shifting a transmission; and a vehicle's electric energy storage device supplies electrical energy to devices of the vehicle being operated by the vehicle occupant.

9. The method of claim 7, where the characterizing includes determining an average and standard deviation of each of the plurality of vehicle electric idle conditions.

10. The method of claim 7, where adjusting the electric energy storage device state of charge includes increasing the electric energy storage device state of charge.

11. The method of claim 7, where adjusting the electric energy storage device state of charge includes reducing the electric energy storage device state of charge.

12. The method of claim 7, further comprising increasing the electric energy storage device state of charge in response to a request to extend a vehicle electric idle time requested by a vehicle occupant.

\* \* \* \* \*